United States Patent [19]
Klink

[11] Patent Number: 5,529,343
[45] Date of Patent: Jun. 25, 1996

[54] SAFETY BELT WITH A RIPPABLE SEAM

[75] Inventor: Gerd Klink, Spraitbach, Germany

[73] Assignee: TRW Repa GmbH, Alfdorf, Germany

[21] Appl. No.: 377,188

[22] Filed: Jan. 24, 1995

[30] Foreign Application Priority Data

Jan. 26, 1994 [DE] Germany .................. 9401314 U

[51] Int. Cl.⁶ .................................................. B60R 22/28
[52] U.S. Cl. ........................................ 280/805; 280/801.1
[58] Field of Search ................................ 280/805, 801.1

[56] References Cited

U.S. PATENT DOCUMENTS

| | | | |
|---|---|---|---|
| 3,444,957 | 5/1969 | Ervin, Jr. ........................... | 182/3 |
| 3,891,272 | 6/1975 | Takada ............................... | 280/805 |
| 4,027,906 | 6/1977 | Matsuoka et al. ................. | 280/805 |
| 5,050,906 | 9/1991 | Kneip ................................. | 280/805 |

FOREIGN PATENT DOCUMENTS

| | | | |
|---|---|---|---|
| 0128662 | 12/1984 | European Pat. Off. . | |
| 0408909 | 1/1991 | European Pat. Off. . | |
| 0636521 | 2/1995 | European Pat. Off. . | |
| 1903055 | 8/1970 | Germany ............................ | 280/805 |
| 2426203 | 12/1975 | Germany ............................ | 280/805 |

*Primary Examiner*—Kenneth R. Rice
*Attorney, Agent, or Firm*—Tarolli, Sundheim, Covell, Tummino & Szabo

[57] ABSTRACT

In a safety belt for vehicles a belt webbing section is composed of two superposed belt webbing plies connected by a rippable seam. The rippable seam comprises seam sections which extend alternatingly transversely in relation to the center line of the belt webbing from one side of such center line to the opposite side and then at least approximately in the longitudinal direction and then back again. In the rippable seam two respective stitches in a seam section extending transversely in relation to the center line of the belt webbing are offset in relation to one another in the longitudinal direction.

8 Claims, 3 Drawing Sheets

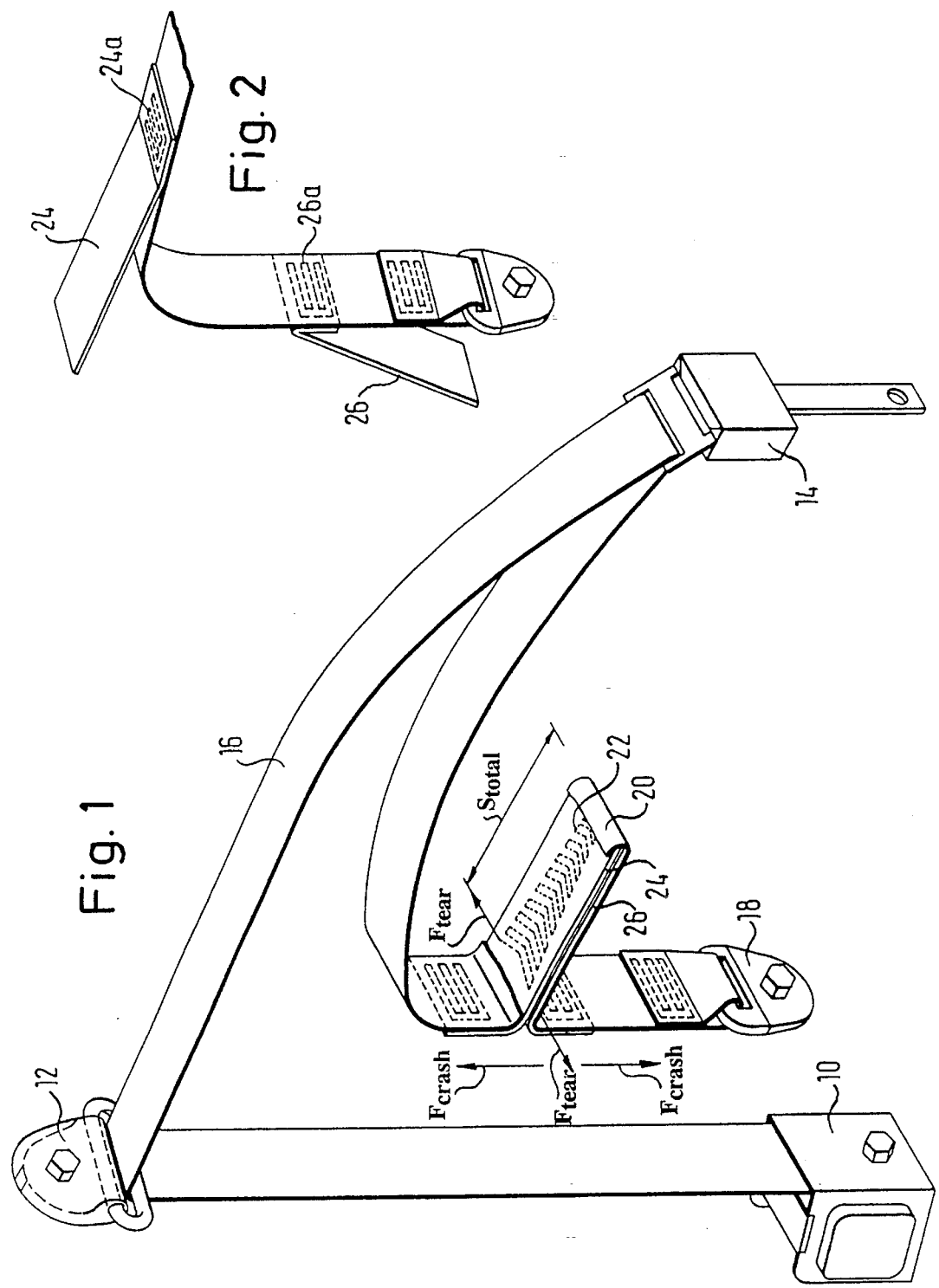

SAFETY BELT WITH A RIPPABLE SEAM

The invention relates to a safety belt for vehicles, comprising a belt webbing section composed of two superposed belt webbing plies connected by at least one rippable seam, the rippable seam comprising seam sections, which extend alternatingly transversely in relation to the center line of the belt webbing from one side of such center line to the opposite side and then at least approximately in the longitudinal direction and then back again.

Such a rippable seam may be employed to reduce the deceleration forces to which a vehicle occupant is subjected during a certain phase of the restraining action of a safety belt. In conjunction with an inflatable protective bag it is thus possible to minimize the risk of injury. If the yield load on the rippable seam is exceeded, there will be an additional forward displacement of the occupant along a limited path. Then energy will be absorbed in the course of this additional forward displacement owing to the progressive ripping of the seam. By a suitable selection of the dimensions of the rippable seam this forward movement of the vehicle occupant as well may be controlled and adapted to the deployment of the protective bag. It is more particularly an advantage if a safety belt with a rippable seam is employed in small cars, which only have a small crush zone.

In currently produced safety belts with rippable seams the rippable seam sections are arranged perpendicularly to the center line of the belt webbing and evenly distributed in the longitudinal direction and respectively connected at one end with an adjacent seam section by a short seam part extending in the longitudinal direction so that a continuous seam is formed. When the limit load of the rippable seam is exceeded the same is ripped apart in steps and in one seam section after the other. Between two respectively consecutively following seam sections the separation of the two superposed belt webbing plies hardly meets with any resistance. The ripping of the rippable seam consequently takes place in discrete steps and in jerks.

The invention provides a safety belt with a rippable seam, in the case of which ripping apart occurs much more evenly in a large number of steps, between which the force only diminishes slightly in comparison with conventional designs. It is in this manner that an even forward displacement of the vehicle occupant is ensured so that the risk of injury is even further decreased.

In accordance with the invention in the rippable seam two respective stitches in a seam section extending transversely in relation to the center axis of the belt webbing are offset in relation to one another in the longitudinal direction. The degree of offset will determine the distance between the individual steps, in which the rippable seam is ripped apart. This step pitch can be made more or less as small as may be desired. Simultaneously there is the possibility of providing a greater number of stitches in each seam section in order to affect the force level which the rippable seam will withstand. In the case of an arrangement of the seam sections perpendicular to the center line of the belt webbing on the contrary the number of possible stitches is limited by the width of the belt webbing.

In the case of the preferred embodiment of the safety belt the stitches extending perpendicularly to the center line of the belt webbing are inclined on each side of this center line oppositely to the same. The stitches are hence aligned approximately symmetrically to the center line of the belt webbing. Furthermore each apex of a seam section arranged on the center line is approximately located on a straight line extending through the outermost stitches of an adjacent seam section. Directly after the ripping of a seam section the ripping of the following seam section will therefore begin.

Further features and advantages of the invention will be gathered from the following description and from the drawing, to which reference should be had.

FIG. 1 is a perspective view of a safety belt system with a safety belt whose rippable seam is as yet intact.

FIG. 2 is a view of part of the safety belt after ripping of the rippable seam.

Figure 3:
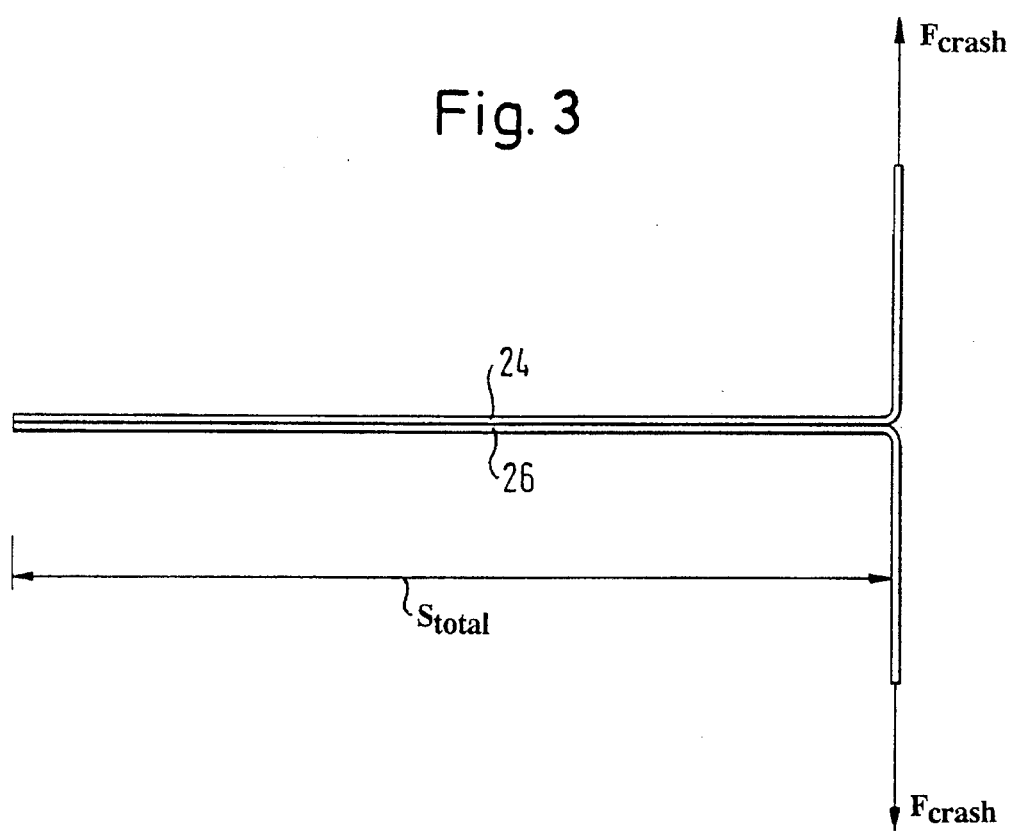

FIG. 3 diagrammatically shows from the side two superposed plies of the safety belt connected together by the rippable seam.

Figure 4:
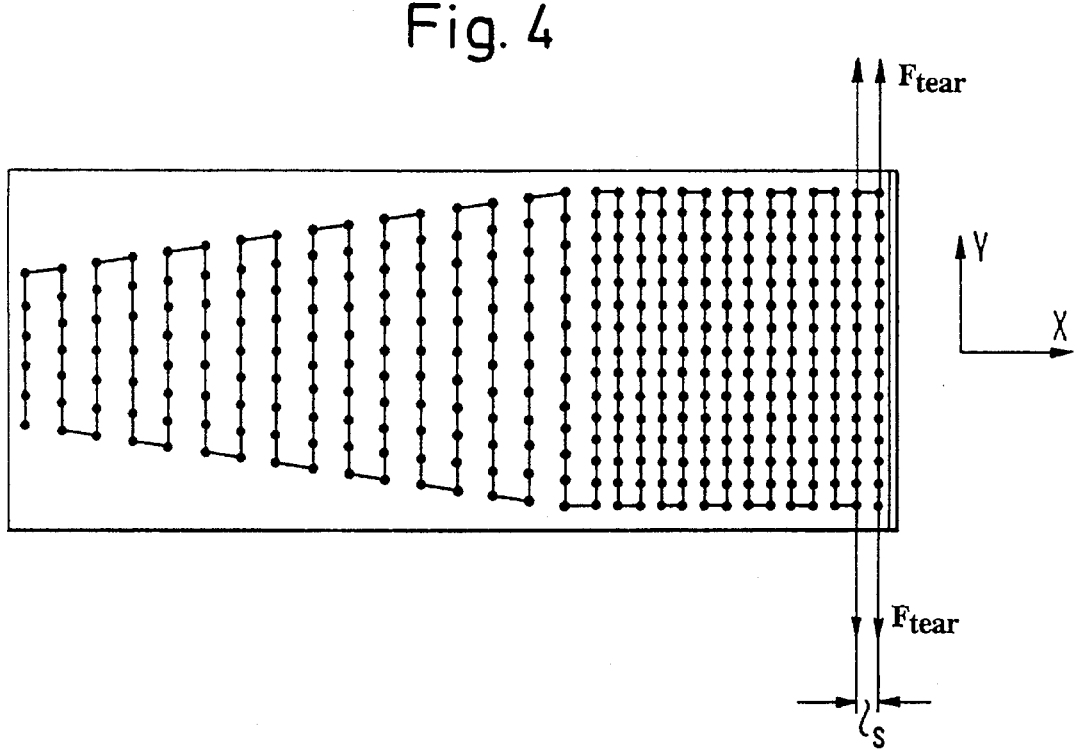

FIG. 4 shows the conventional design of the rippable seam in plan view looking toward the plies of the belt webbing.

Figure 5:
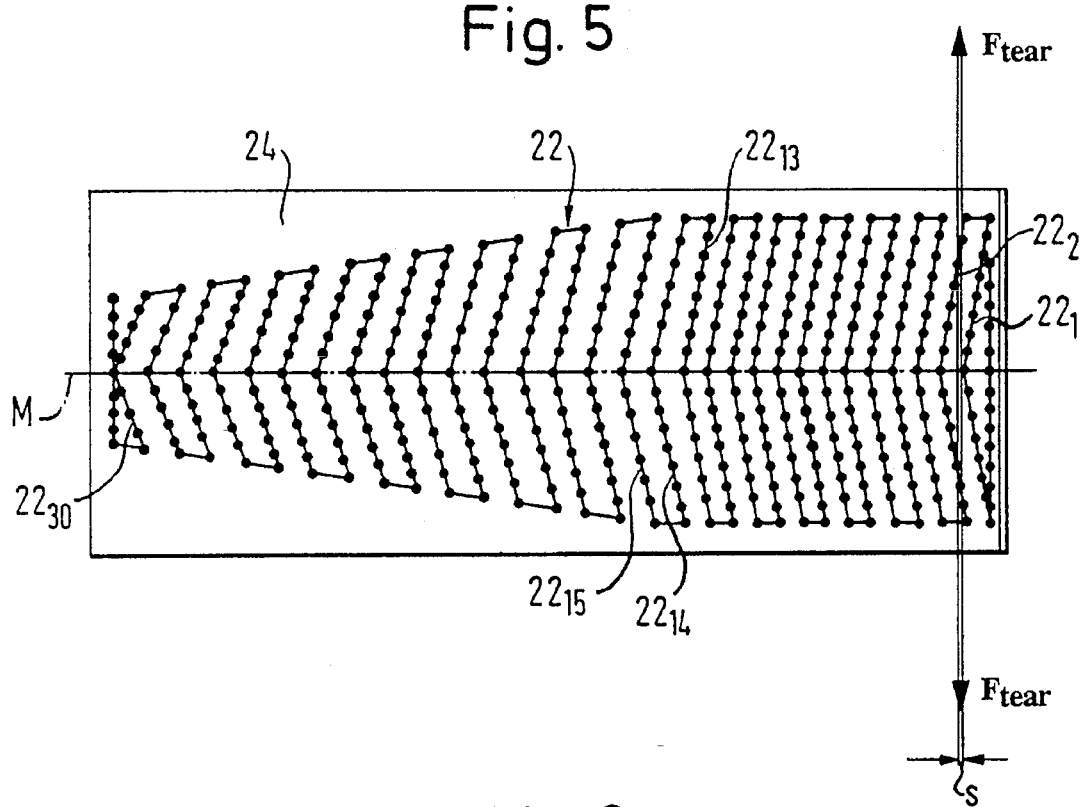

FIG. 5 shows the design of the rippable seam in accordance with the invention in plan view looking toward the belt webbing plies having the same.

Figure 6:
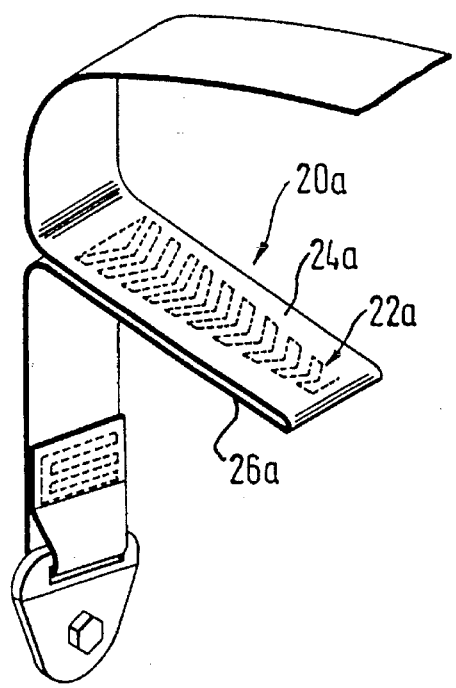

FIG. 6 shows a modified form of the invention.

The conventional components of the safety belt system depicted in FIG. 1 are a belt retractor 10 fitted to the vehicle bodywork, a loop bracket 12 attached to the B pillar of the vehicle body, an attachment tongue 14 and the safety belt itself, which is referenced 16. The free end of the safety belt 16 is attached to the vehicle body by means of an anchoring fitting 18.

Adjacent to such anchoring fitting 18 a loop 20 of the safety belt is formed, within which loop 20 there are two flap-like superposed safety belt plies 24 and 26 which are connected together by a rippable seam 22. The ends, which are clear of the loop 20 of the safety belt, of the flap-like plies 24 and 26 of the safety belt are each attached by a respective seam 24a and, respectively, 26a of the webbing of the safety belt 16.

In FIG. 3 only the belt webbing plies 24 and 26 are illustrated, since the rippable seam 22 is only provided thereon. The length as measured in the longitudinal direction of the belt webbing, along which the belt webbing sections or plies 24 and 26 are connected with each other by the rippable seam 22, is indicated as $S_{total}$. Along this length $S_{total}$ the rippable seam 22 is ripped open to a maximum extent, the effective length of the safety belt 16 increasing by a factor of two. The ripping of the seam 22 takes place under the action of the tension forces occurring on either side of the loop 20 of safety belt and opposite to each other, such forces being indicated in FIG. 3 as $F_{crash}$.

FIG. 4 shows the conventional design of the rippable seam. It consists of two parallel seam sections perpendicular to the center line of the belt webbing and which are respectively joined at one end with an adjacent seam section. Under the action of the forces $F_{crash}$ arising on either side of the belt webbing loop 20 the rippable seam is loaded along parallel lines of action of the ripping force, such lines being indicated as $F_{tear}$ in FIG. 4. The distances between these lines of action of the ripping forces in the longitudinal direction of the belt webbing are clearly equal to the distance between the seam sections. This distance is referenced s in FIG. 4. When the yield load for the rippable seam is reached the individual seam sections are torn apart one after the other. After ripping of the individual seam sections it is possible for the plies 24 and 26 of belt webbing to be drawn apart without any great application of force until after the length or distance s the next seam section is reached. The reader will perceive that the rippable seam is torn apart in individual, discrete steps, between which the ripping force drops to practically zero.

In the illustrated working design of the rippable seam 22 depicted in FIG. 5 the reader will firstly be able to see a first group of seam sections $22_1, 22_2, \ldots 22_{13}$, between which the distances in the longitudinal direction are smaller than in a second group of seam sections $22_{14}, 22_{15}, \ldots 22_{30}$. The seam sections extend alternatingly perpendicularly in relation to the center line M of the belt webbing from one side of this center line to the opposite side, then along a short distance in the longitudinal direction and back again, a continuous seam being formed. Unlike a conventional rippable seam however the seam sections do not extend perpendicularly to the center line M but rather at an acute angle to the same. Furthermore, the seam sections are arranged with bilateral symmetry about the center line M. This arrangement means that each two adjacent stitches, extending in a seam section running normally to the center line M, of the rippable seam are offset in relation to one another in the longitudinal direction by an amount s, which is very much smaller than in a conventional rippable seam (FIG. 4). Therefore lines $F_{tear}$ if action of the rip force are formed, which in the longitudinal direction of the belt webbing have only a small distance between them. In fact there is practically no limit to a reduction in the size of the distance s so that between two adjacent rip force lines of action extending in the longitudinal direction the force required for tearing apart the plies 24 and 26 of belt webbing only decreases to a slight extent. The reader will perceive from FIG. 5 furthermore that the apex of one seam section lies on the same line of action of the rip force, which extends through the outer stitches of an adjacent seam section. This particular feature contributes to an equalization of the rip forces.

The rip force, at which the rippable seam 22 yields, is among other things dependent of the nearness together or density of the stitches. In the case of the design of the rippable seam 22 depicted in FIG. 5, the closeness together of the stitches in the first group of seam sections $22_1$ to $22_{13}$ is greater than in the second group of stitches $22_{14}$ to $22_{30}$. Moreover in this second group of stitches the number of stitches gradually diminishes so that the seam sections become shorter toward the seam section $22_{30}$. Owing to this distribution of the closeness together of the stitches it is possible for the rip properties to be controlled and more particularly optimally adapted to the function of the inflatable protective bag simultaneously employed in the vehicle occupant restraining system.

For the belt webbing of the safety belt 16 and of the plies 22 and 24, just like the threads in the rippable seam 22, the material PES is employed. The thread has an extension of between 15 and 26% so that it is possible to prevent a sudden rupture of the seam and a violent as opposed to a smooth beginning of the ripping action. The critical load of the thread will be selected dependent of the rip force in question.

In the case of the modification of the invention illustrated in FIG. 6 the rippable seam 22a is directly arranged in a loop 20a of the belt webbing. The loop 20a is constituted by the two superposed plies 24a and 26a of the belt webbing.

What is claimed is:

1. A safety belt for vehicles comprising a webbing section composed of two superimposed belt webbing plies, said webbing section extending in a longitudinal direction and having two opposed longitudinal edges with a center line extending between said edges, said belt webbing plies being connected by at least one rippable seam composed of stitches along longitudinally spaced transverse seam sections which extend alternatingly transverse to and across said center line between said edges, and of stitches along connecting seam sections alternatingly connecting successive transverse seam sections on either side of said center line forming a continuous seam, and adjacent stitches in each transverse seam section being longitudinally shifted with respect to each other.

2. The safety belt of claim 1, wherein said transverse seam sections are oppositely inclined to said center line on both sides therof.

3. The safety belt of claim 2, wherein said transverse seam sections have an apex located on said center line and opposed end stitches located on a line perpendicular to said center line and extending through an apex of an adjacent transverse seam section.

4. The safety belt of claim 1, wherein said transverse seam sections are provided in a plurality of groups with different longitudinal spacings.

5. The safety belt of claim 1, wherein said belt webbing plies are located within a loop formed by said safety belt, said belt webbing plies each having a free end extending out of said loop and connected to portions of said safety belt adjacent said loop.

6. The safety belt of claim 1, wherein said belt webbing plies form a loop.

7. A safety belt for vehicles comprising:

a webbing section composed of two superimposed belt webbing plies;

said webbing section extending in a longitudinal direction and having two opposed longitudinal edges with a center line extending between said edges;

said belt webbing plies being connected by at least one rippable seam composed of stitches along longitudinally spaced transverse seams sections which extend alternatingly transverse to and across said center line between said edges, and of stitches along connecting seam sections on either side of said center line forming a continuous seam; and adjacent stitches in each transverse seam section being longitudinally shifted with respect to each other;

said transverse seam sections being oppositely inclined to said center line on both sides thereof.

8. The safety belt of claim 7 wherein said transverse seam sections have an apex located on said center line and opposed end stitches located on a line perpendicular to said center line and extending through an apex of an adjacent transverse seam section.

* * * * *